US011656738B2

United States Patent
Wang

(10) Patent No.: US 11,656,738 B2
(45) Date of Patent: May 23, 2023

(54) SECURE OPERATION METHOD FOR ICON BASED ON VOICE-SCREEN-MOUSE VERIFICATION

(71) Applicant: NANJING INSTITUTE OF RAILWAY TECHNOLOGY, Nanjing (CN)

(72) Inventor: Lisong Wang, Nanjing (CN)

(73) Assignee: NANJING INSTITUTE OF RAILWAY TECHNOLOGY, Nanjing (CN)

( * ) Notice: Subject to any disclaimer, the term of this patent is extended or adjusted under 35 U.S.C. 154(b) by 174 days.

(21) Appl. No.: 17/256,650

(22) PCT Filed: Jun. 25, 2019

(86) PCT No.: PCT/CN2019/092714
§ 371 (c)(1),
(2) Date: Dec. 29, 2020

(87) PCT Pub. No.: WO2020/001421
PCT Pub. Date: Jan. 2, 2020

(65) Prior Publication Data
US 2021/0263638 A1    Aug. 26, 2021

(30) Foreign Application Priority Data
Jun. 29, 2018   (CN) .......................... 201810713169.X

(51) Int. Cl.
G06F 3/04817 (2022.01)
G06F 3/0354 (2013.01)
(Continued)

(52) U.S. Cl.
CPC ...... *G06F 3/04817* (2013.01); *G06F 3/03543* (2013.01); *G06F 3/0484* (2013.01);
(Continued)

(58) Field of Classification Search
None
See application file for complete search history.

(56) References Cited

U.S. PATENT DOCUMENTS

| 5,386,494 A | 1/1995 | White |
| 2009/0217190 A1* | 8/2009 | Yamagishi ........... H04N 21/426 345/163 |

(Continued)

FOREIGN PATENT DOCUMENTS

| CN | 103186231 A | 7/2013 |
| CN | 106168895 A | 11/2016 |

(Continued)

OTHER PUBLICATIONS

Retrieved from: http://www.yingzixitong.cn/product.html, Shadow System PowerShadow 8.5, 2014.

(Continued)

*Primary Examiner* — Matthew Ell
*Assistant Examiner* — David V Luu
(74) *Attorney, Agent, or Firm* — Bayramoglu Law Offices LLC

(57) ABSTRACT

A secure operation method for an icon based on a voice-screen-mouse ternary verification includes verifying and comparing an icon associated with an operator's voice, an icon displayed on the screen to specify an operation, and an icon to which the mouse points when the mouse stops moving, and providing permission for operation and warning by a system. An association between a specific voice and the icon is established first. An associated icon is activated by a voice input of a voice recognition system, and then verification and comparing is performed with the icon to which the mouse points when the mouse stops moving. For the touch screen computer and mobile terminal, the binary verification is performed through the icon associated with the operator's voice and the icon displayed on the screen to (Continued)

specify the operation. The system provides authorization for the operation.

5 Claims, 3 Drawing Sheets

(51) Int. Cl.
    *G06F 3/0484* (2022.01)
    *G06F 3/0488* (2022.01)
    *G06F 3/16* (2006.01)
    *G08B 21/18* (2006.01)
    *B61L 27/10* (2022.01)

(52) U.S. Cl.
    CPC ............ *G06F 3/0488* (2013.01); *G06F 3/167* (2013.01); *B61L 27/10* (2022.01); *G08B 21/18* (2013.01)

(56) References Cited

U.S. PATENT DOCUMENTS

| | | | |
|---|---|---|---|
| 2014/0258855 A1 | 9/2014 | Mauro et al. | |
| 2014/0359438 A1* | 12/2014 | Matsuki | G06F 3/016 715/702 |
| 2015/0212791 A1 | 7/2015 | Kumar et al. | |
| 2015/0253919 A1* | 9/2015 | Li | G06F 3/04842 345/157 |
| 2015/0319170 A1* | 11/2015 | Grossemy | H04L 63/0861 713/186 |
| 2016/0291831 A1* | 10/2016 | Baek | G06F 3/04817 |
| 2016/0370866 A1* | 12/2016 | Hwang | G06F 3/04883 |
| 2018/0321807 A1* | 11/2018 | Ward | G06F 8/34 |
| 2019/0052265 A1* | 2/2019 | Yokoyama | G06F 3/04886 |
| 2020/0053518 A1* | 2/2020 | Kang | H04W 76/50 |
| 2020/0103021 A1* | 4/2020 | Eichhorn | F16H 59/12 |
| 2020/0262458 A1* | 8/2020 | Flaminio | H04L 63/0435 |
| 2020/0333944 A1* | 10/2020 | Guo | G06F 3/0486 |

FOREIGN PATENT DOCUMENTS

| | | |
|---|---|---|
| CN | 106201312 A | 12/2016 |
| CN | 106898349 A | 6/2017 |
| CN | 107112014 A | 8/2017 |
| CN | 107657953 A | 2/2018 |
| CN | 107748602 A | 3/2018 |
| CN | 108364645 A | 8/2018 |
| CN | 109189280 A | 1/2019 |
| CN | 110007826 A | 7/2019 |
| CN | 210822020 U | 6/2020 |
| JP | 2007127895 A | 5/2007 |

OTHER PUBLICATIONS

Bai Rong, et al., Discussion on the preparation of the departure route when the circuit of the double-track automatic blocking track circuit fails, Shanghai Railway Technology, 2017, 65-66,51, Issue 2.

* cited by examiner

SECURE OPERATION METHOD FOR ICON BASED ON VOICE-SCREEN-MOUSE VERIFICATION

CROSS REFERENCE TO THE RELATED APPLICATIONS

This application is the national phase entry of International Application No. PCT/CN2019/092714, filed on Jun. 25, 2019, which is based upon and claims priority to Chinese Patent Application No. 201810713169.X, filed on Jun. 29, 2018, the entire contents of which are incorporated herein by reference.

TECHNICAL FIELD

The present invention relates to the technical field of computer and data security, in particular to a secure operation method for an icon based on a voice-screen-mouse verification.

BACKGROUND

With advances in computer and internet technology, it is commonplace to control the operation of background equipment by operating the corresponding activatable icons on the screens of computers and mobile terminals. However, due to various restrictions, the size of computer screen and mobile phone screen is always limited, and relevant application software developers can only arrange control icons in a limited space. In use, this inevitably leads to a large number of maloperations by users.

There are two kinds of maloperations: one is that the operation performed is consistent with the subjective desire of the operator at that time, but it has caused adverse consequences objectively; the other is that the operation performed is inconsistent with the subjective desire of the operator at that time, and it is caused by mistakenly clicking icons on the screen. The first type of maloperation has nothing to do with equipment, and cannot be prevented on technical equipment, which is completely determined by the person's technical and professional level. The second type of maloperation is an error occurring in the process of human-computer interaction, which is caused by the imprudent operation of the user and the inconvenient operation of equipment. The invention is aimed at the second maloperation.

Under the existing conditions, there are two ways to reduce the maloperation in the process of human-computer interaction. The first is to strengthen the training of operators, improve the professional quality of operators, and strictly enforce rules and regulations to ensure that operators earnestly confirm before operation. This approach is a management issue. The second is to increase the redundancy of the operation during system design, and ensure the correctness of the operation by re-confirming the prompt or double or even multi-person operation check. This approach is a technical approach.

The existing technical approaches have the following problems:

1. Although the "re-confirmation" gives the operator a chance to review again, the operator is generally overconfident and may click on the icon to confirm too quickly, incorrect confirmation still occurs. In addition, for more frequent operations, re-confirmation not only increases the time and difficulty of the operation, but also makes the operator burnout and lose vigilance due to constant confirmation. Especially for high-frequency operations with a significant time requirement, such as railway traffic command, frequent confirmation is not feasible.

2. The double or multi-person operation check has a relatively high accuracy, which is at the cost of cumbersome operation process. Such an operation process requires more personnel, and increases the contact time between operators, which cannot ensure timeliness, and will enhance labor costs.

SUMMARY

Aiming at the deficiencies in the prior art, the present invention provides a secure operation method for an icon based on a voice-screen-mouse ternary verification to reduce errors in the human-computer interaction process. The so-called voice-screen-mouse ternary verification refers that the "voice icon" associated with the content of the operator's speaking, the "screen icon" displayed on the screen to specify the operation, and the "mouse icon" at which the mouse points when it stops moving must be exactly consistent, otherwise the system will issue an alarm or prohibit the operation.

In order to achieve the above purpose, the present invention adopts the following technical solutions.

A secure operation method for an icon based on a voice-screen-mouse ternary verification includes: verifying and comparing an icon associated with an operator's voice, an icon displayed on a screen and used to specify an operation, and an icon to which a mouse points when it stops moving, and giving an operation permission and warning by a system; first establishing an association between a specific voice and the icon, activating an associated icon through a voice input of a voice recognition system, and then checking and comparing with the icon to which the mouse points when it stops moving.

In order to optimize the above technical solution, the specific measures taken also include:

Specifically include the following steps:

step 1, association setting of the voice and a screen icon: setting a corresponding relationship between the voice and the screen icon, building a voice icon;

step 2, associating with a voice recognition system: when the system receives the specific voice, activating the corresponding screen icon;

step 3, association setting of the mouse and the screen icon: When the mouse stays in an icon area that is not activated by the voice, associating the mouse with the screen icon according to a level of safety production requirement;

step 4, setting a screen area when the mouse is not operated: setting a staging area on the screen for the mouse when the mouse is not operated.

In step 1, the corresponding relationship between the voice and the screen icon is one-to-one correspondence, many-to-one correspondence or one-to-many correspondence.

In step 2, according to the association setting between the voice and the screen icon, the specific voice can activate one or more screen icons.

In step 3, the association setting of the mouse and the screen icon includes two levels according to the level of safety production requirement. The first level is activating the mouse, issuing an alarm and prohibiting the operation; and the second level is activating the mouse, issuing an alarm and permitting the operation. When the mouse stays in the icon area activated by the voice, the mouse can be normally operated.

In step 4, when the mouse is placed in the staging area, the voice recognition system automatically turns off a voice receiving function; when the mouse is not operated and not placed in the staging area after a preset time, the area displays an alarm.

Further, the present invention further provides a secure operation method for an icon based on a voice-screen-mouse ternary verification, in which, a shadow system provides protection for an original system. The shadow system is equipped with a shadow icon, the shadow icon has exactly the same size as and a one-to-one correspondence with the icon on the screen of the original system, and the shadow icon is used to replace the icon of the original system accordingly to establish an association of the voice and the shadow icon. The shadow system runs independently without any effect on an operation of the original system, and is only used for verification of operations of the voice, the icon and the mouse.

Further, the present invention provides a secure operation method for an icon based on a voice-screen binary verification. For a touch screen computer or a touch screen mobile terminal, the binary verification is performed through an icon associated with an operator's voice and an icon displayed on the screen for specifying an operation, and the system gives an operation authority.

Further, the present invention provides a secure operation method for an icon based on a voice-screen binary verification. For a touch screen computer or a touch screen mobile terminal, a shadow system provides protection for an original system. The shadow system is provided with a shadow icon. The shadow icon has exactly the same size as and a one-to-one correspondence with the icon on the screen of the original system, and the shadow icon is used to replace the corresponding icon of the original system to establish an association between the voice and the shadow icon. The shadow system runs independently without any effect on an operation of the original system and is only used for the verification of operations of the voice and the icon.

The advantages of the present invention are as follows:

1. With respect to the current maloperation problems in computer and mobile terminal screen operations, the present invention provides a secure operation method for an icon based on a voice-screen-mouse ternary verification, so as to reduce errors in the human-computer interaction process. Especially in the field with high security requirement, it is required to strictly confirm before operation and achieve the consistency of "eyes, hands, and mouths", which, however, depends heavily on the quality of people. This method utilizes modern voice recognition tools to verify human behavior through a computer system to ensure correct operation to the greatest extent and avoid accidents.

2. In order to protect secure operation of an original system, the present invention proposes the concept and method of a "shadow system". Since the shadow system is independently developed and runs independently, it is only used for voice, screen and mouse operation verification and has no effect on the operation of the original system. This makes it possible to provide independent safe operation protection software for the original system, facilitating development and enhancing practicability.

DETAILED DESCRIPTION OF THE EMBODIMENTS

The present invention will now be further described in detail with reference to the drawings.

The technical solutions implemented by the invention include the newly developed system and the existing system.

I. The Newly Developed System

For the newly developed system, the following work needs to be added when programming:

1. Setting the Associated Information Between the Voice and the Screen Icon

The so-called setting of the associated information between the voice and the screen icon is to set the corresponding relationship between the voice and the screen icon to construct the voice icon. In principle, the association between the voice and the icon is a one-to-one correspondence, but when the system is more complex, emphasizing the one-to-one correspondence may complicate the voice and bring inconvenience to the operation. Therefore, it can be designed as many-to-one correspondence and one-to-many correspondence according to practical use, voice complexity and security level requirements.

2. Associating with the Voice Recognition System

Associating with the voice recognition system means that when the system receives a specific voice, the corresponding screen icon will be activated. According to the setting of the associated information between the voice and the screen icon, the specific voice can activate one screen icon or multiple screen icons.

3. Association Setting of the Mouse and the Screen Icon

When the mouse stays in the icon area that is not activated by the voice, the association setting of the mouse and the icon can be set to 2 levels according to the level of safety production requirements. The first level is activating the mouse, issuing an alarm, and prohibiting an operation, which is the safest setting. The second level is activating the mouse, issuing an alarm, and permitting the operation. At this time, the operator is reminded to strengthen confirmation. When the mouse stays in the icon area that is activated by the voice, it can operate normally.

4. Setting the Screen Area when the Mouse is not Operated

A staging area is set in a blank area of the display screen for the mouse when the mouse is not operated. This setting is to standardize the placement of the mouse when there is no operation. At the same time, when the mouse is placed in the staging area, the voice system will automatically turn off the voice receiving function to minimize the interference of external voice to the system. If the mouse is not placed in the staging area after a preset time when there is no operation, the area will display an alarm.

Figure 1:
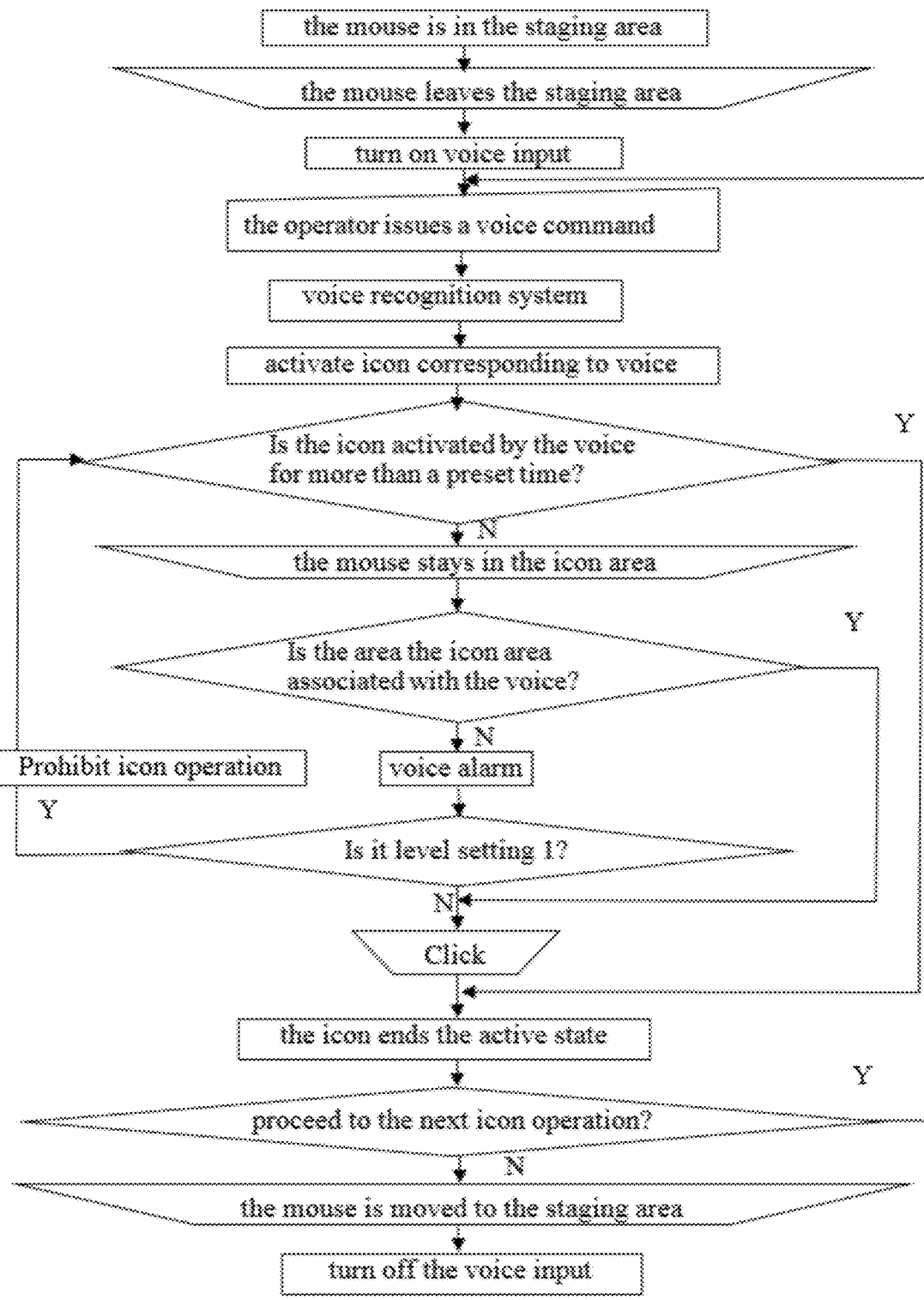
FIG. 1 is a system flow chart of an icon operation based on a ternary verification.

The system flow chart of the icon operation based on the voice-screen-mouse ternary verification of the newly developed system is shown in FIG. 1. The time that the icon is activated by the voice should be determined according to the frequency of system operation and relevant operation management regulations.

II. The Existing System

Since the existing system has not established the association of the voice, icon and mouse during system development, it is necessary to separate from the original system and establish a "shadow system" corresponding to the original system.

The shadow system is equipped with the shadow icons that have exactly the same size as and a one-to-one correspondence with the icons on the screen of the original system, and the shadow mouse staging area is additionally provided. The shadow icons are used to replace the corresponding original system icons, and the associated information between the voice and the shadow icons is established as in the newly developed system. At the same time, the shadow mouse staging area is set when the mouse is not operated. The shadow system is independently developed and runs independently without any effect on the operation of the original system. It is only used for the voice, icon and mouse operation verification. The system flow chart of the icon operation is the same as that shown in FIG. 1.

Figure 2:
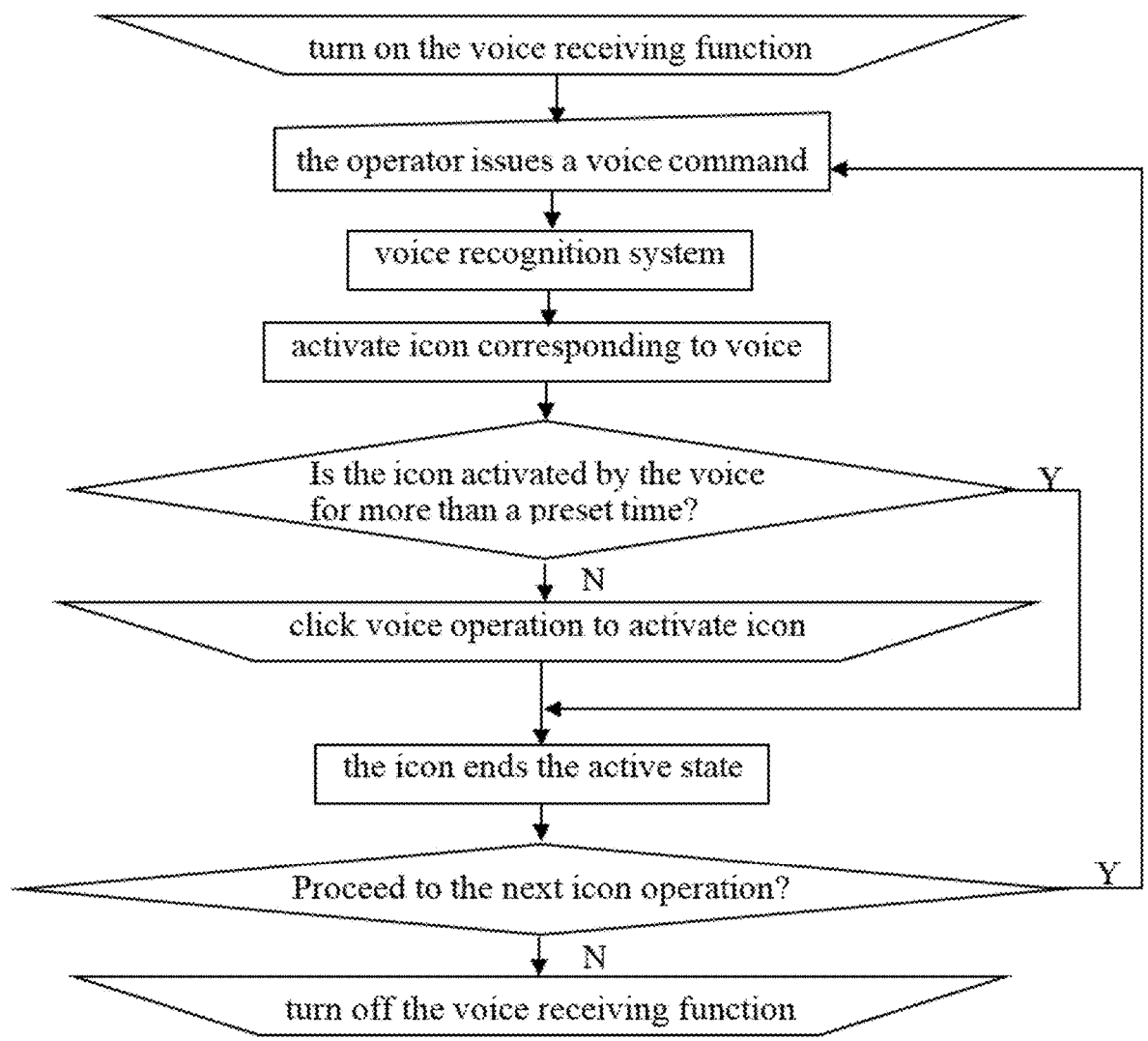
FIG. 2 is a system flow chart of an icon operation based on a binary verification.

For the touch screen computer and mobile terminal, since there is no mouse, a binary verification of icons associated with the operator's voice and icons displayed on the screen for specifying operations is established. There is no association setting between the icon and the mouse and the mouse staging area. When the binary verification does not match, the system gives a prohibited operation. The system flow chart of the icon operation is shown in FIG. 2.

The operation of the receiving and dispatching train console of the railway station signal building is used to illustrate the implementation of the present invention.

Figure 3:
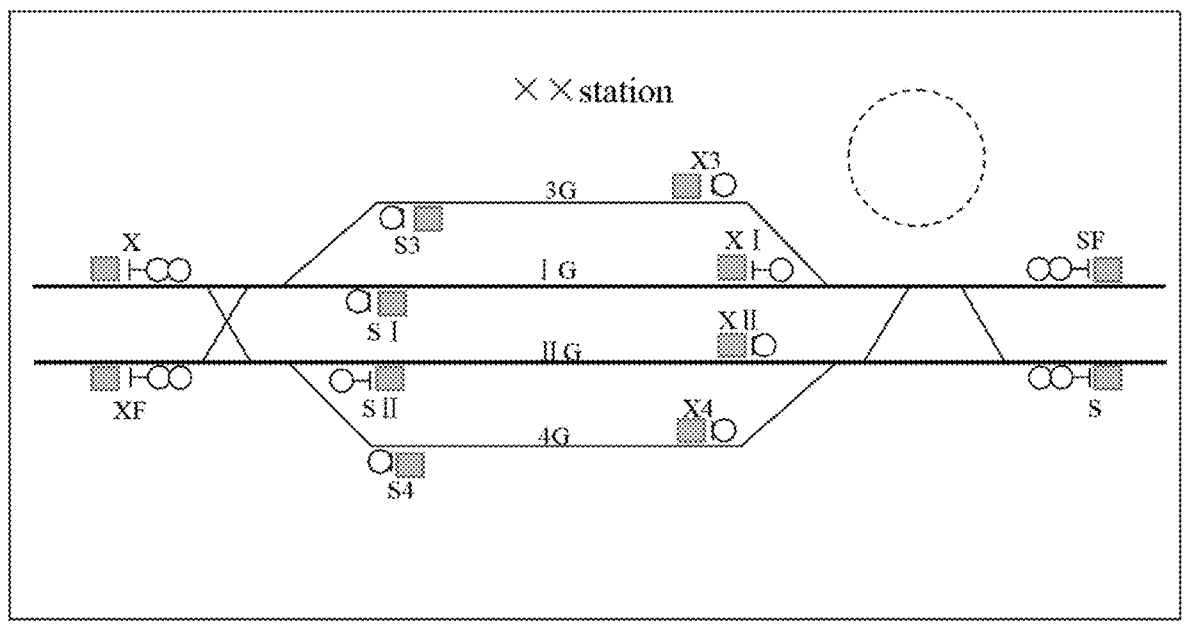
FIG. 3 is a schematic diagram of a two-line automatic blocking railway station console.

FIG. 3 is a schematic diagram of a two-line automatic blocking railway station console. The operator controls the turnout switching and signal opening by operating the buttons on the screen. A mistaken operation may cause the train to enter the wrong track or go in the wrong direction.

1. Setting the Associated Information of the Voice and the Operation Button

Since the forward direction inbound button on the console is also the reverse direction outbound button, and the reverse direction inbound button is also the forward direction outbound button, the established association information table between the voice and the button has one-to-one correspondence and one-to-many correspondence, see Table 1.

TABLE 1 association information between the button and the voice

| Serial number | Associated voice | Button name |
|---|---|---|
| 1 | Downward inbound, Upward outbound in the reverse direction | X |
| 2 | Upward inbound, Downward outbound in the reverse direction | S |
| 3 | Downward inbound in the reverse direction, Upward outbound | XF |
| 4 | Upward inbound in the reverse direction, Downward outbound | SF |
| 5 | Downward lane 1 | XI |
| 6 | Upward lane 1 | SI |
| 7 | Downward lane 2 | XII |
| 8 | Upward lane 2 | SII |
| 9 | Downward lane 3 | X3 |
| 10 | Upward lane 3 | S3 |
| 11 | Downward lane 4 | X4 |
| 12 | Upward lane 4 | S4 |

In the case of more buttons, the association between the buttons and the voice may be more complicated, which brings inconvenience to the operation. Considering that the railway control console is operated separately on the left and right sides according to upward and downward directions except for one pass. Voice distinction between upward and downward direction is not necessary in actual operation. The corresponding relationship can be simplified into Table 2 in combination with relevant railway operating standards.

TABLE 2

Simplified association information between the button and the voice

| Serial number | Associated voice | Button name |
|---|---|---|
| 1 | Inbound, Outbound in the reverse direction | X, S |
| 2 | Inbound in the reverse direction, Outbound | XF, SF |
| 3 | lane 1 | XI, SI |
| 4 | lane 2 | XII, SII |
| 5 | lane 3 | X3, S3 |
| 6 | lane 4 | X4, S4 |

2. Associating with the Voice Recognition System

According to the associated information between the voice and the screen icon, each voice is set to activate the screen icon through the voice recognition system. For example, the voice of "inbound" can activate the X button and the S button; the voice of "lane 1" can activate the XI button and the SI button.

3. Association Setting of the Mouse and Button

When the mouse stays in the button area that is not activated by the voice, the safety operation settings of the mouse are set to be the first level, the mouse is activated and an alarm is issued, and the operation is prohibited.

4. Setting the Screen Area when the Mouse is not Operated

The staging area is set in a blank area on the display screen for the mouse when the mouse is not operated, as shown in the dotted circle area in FIG. 3. When the mouse is placed in the dotted circle area, the voice system will automatically turn off the voice receiving function. If the mouse is not placed in the staging area after a preset time when there is no operation, the area will display an alarm.

The above is an example of the newly developed system. For the existing system, the "shadow system" corresponding to the original system must be established and run independently.

It should be noted that the terms such as "up", "down", "left", "right", "front", "rear", etc., used in the invention are only for clarity of description, not for limitation of the implementation scope of the present invention. The change or adjustment of the mutual relationship, shall be regarded as the scope of implementation of the present invention without substantially changing the technical content.

The above are only the preferred embodiments of the present invention, and the protection scope of the present invention is not limited to the above-mentioned embodiments. All technical solutions under the idea of the present invention belong to the protection scope of the present invention. It should be pointed out that for those skilled in the art, several improvements and modifications without departing from the principle of the present invention should be regarded as the protection scope of the present invention.

What is claimed is:

1. A secure operation method for an icon based on a voice-screen-mouse ternary verification, comprising: verifying and comparing a first icon associated with a voice of an operator, a second icon displayed on a screen and used to specify an operation, and a third icon configured to be directed by a mouse when the mouse stops moving, and giving a permission and a warning of the operation by a system; wherein an association between a predetermined voice and the first icon is firstly established, the first icon is activated by a voice input of a voice recognition system, and then the verifying and comparing is performed on the first icon with the third icon, wherein the secure operation method specifically comprises the following steps:

step 1, an association setting of the voice and the first icon: setting a corresponding relationship between the voice and the first icon to build a voice icon;

step 2, associating the voice icon with the voice recognition system: when the voice recognition system receives the predetermined voice, activating the first icon;

step 3, an association setting of the mouse and the third icon: when the mouse stays in an icon area not activated by the voice, performing the association setting of the mouse and the third icon according to a level of a safety production requirement; and step 4, setting a screen area when the mouse is not operated: setting a staging area on the screen for the mouse when the mouse is not operated, wherein in step 4, when the mouse is placed in the staging area, the voice recognition system automatically turns off a voice receiving function; when the mouse is not operated and the mouse is not placed in the staging area after a preset time, the staging area displays an alarm.

2. The secure operation method according to claim 1, wherein in step 1, the association setting of the voice and the first icon is a one-to-one correspondence, a many-to-one correspondence or a one-to-many correspondence.

3. The secure operation method according to claim 1, wherein in step 2, according to the association setting of the voice and the first icon, the predetermined voice activates one or more screen icons.

4. The secure operation method according to claim 1, wherein in step 3, the association setting of the mouse and the third icon comprises two levels according to the level of the safety production requirement, wherein, a first level of the two levels comprises: activating the mouse, issuing the alarm, and prohibiting the operation; and a second level of the two levels comprises: activating the mouse, issue the alarm, and permitting the operation; when the mouse stays in the icon area activated by the voice, the mouse normally operates.

5. A secure operation method for an icon based on a voice-screen-mouse ternary verification, comprising: providing a shadow system for an original system for a protection, wherein the shadow system is equipped with a shadow icon, the shadow icon has a same size as and a one-to-one correspondence with an icon on a screen of the original system, and a shadow mouse staging area is added; the shadow icon is used to replace the icon of the original system, and associated information of a voice and the shadow icon is established; the shadow mouse staging area is synchronously set when a mouse is not operated; wherein, the shadow system runs independently without any effect on an operation of the original system, and the shadow system is only used for the voice-screen-mouse ternary verification; the secure operation method specifically comprises the following steps:

step 1, an association setting of the voice and the shadow icon: setting a corresponding relationship between the voice and the shadow icon to build a shadow voice icon;

step 2, associating the shadow voice icon with a voice recognition system: when the voice recognition system receives a predetermined voice, activating the corresponding shadow icon;

step 3, an association setting of the mouse and the shadow icon: when the mouse stays in a shadow icon area not activated by the voice, performing the association setting of the mouse and the shadow icon according to a level of a safety production requirement; and step 4, setting a screen area when the mouse is not operated: setting the shadow mouse staging area on the screen for the mouse when the mouse is not operated, wherein in step 4, when the mouse is placed in the shadow mouse staging area, the voice recognition system automatically turns off a voice receiving function; when the mouse is not operated and the mouse is not placed in the shadow mouse staging area after a preset time, the shadow mouse staging area displays an alarm.

* * * * *